Patented July 27, 1943

2,325,217

UNITED STATES PATENT OFFICE 2,325,217

MANUFACTURE OF PROCESS CHEESE

William O. Beers, Kendallville, Ind., assignor to Kraft Cheese Company, Chicago, Ill., a corporation of Delaware No Drawing. Application August 2, 1940, Serial No. 350,131

4 Claims. (Cl. 99—116)

The invention relates to the manufacture of materials or ingredients which are well adapted for use in the manufacture of process cheese, which term as used herein refers to a process of heat treatment by which the cheese is rendered sufficiently plastic or fluid to be molded into loaves or other units suitable for distribution to or by the retailer.

Heretofore, in the manufacture of process cheese, for example as described in the Kraft Patent No. 1,400,171, issued December 13, 1921, it has been believed that a good, fine-flavored process cheese could not be made unless the cheese had arrived at a satisfactory state of cure before subjecting it to the processing operations. To this end, most process cheese of the better qualities has been made from a blend of cheese of various ages, but all such cheese which has been commercially processed, so far as I am advised, has been finished merchantable cheese, prepared for sale as bulk cheese in such shapes and types of packages as have been ordinarily used in connection with the type of cheese being processed.

The invention herein referred to has been very successfully used in connection with the manufacture of Cheddar type cheese, i. e. the ordinary cheese sold under such names as American, Canadian, English Dairy, etc. However, the indications are that the method may be successfully employed in connection with other types of cheese, for example Swiss or Brick. A typical procedure which I have used is as follows:

General method

In general, it may be said that my improved procedure involves no important change in the usual cheese-making procedure up to the time when the whey is drained from the curd. Thereafter, the procedure differs from the usual in that instead of making the ordinary cheese in the usual manner and then curing that cheese before processing, I treat the curd in such a manner as to cause it to absorb a substantial amount of edible acid. Such acids as lactic, acetic, propionic may be used. After the acid treatment the material is drained and as soon as conveniently possible it may be processed in a kettle or other processing apparatus. It is found that only about twenty-four hours or less of elapsed time is required from the hour when the whole milk enters the cheese factory to the time when the cheese is molded and packaged into the usual boxes, cartons or other forms in which process cheese is sold over the counter.

Satisfactory process cheese can be made by this general method when using 100% of the material referred to. Or, if desired, the material prepared and treated by the aforesaid general method may be blended with other cheese. For such blending purposes, aged cheese or relatively new cheese may be employed according to the flavor or other characteristics desired in the final product. It will be seen that, according to the general method above outlined, it is not necessary, in the case of "American" cheese, to subject the material to the usual cheddaring or matting and milling operations in the vat, nor, is it necessary to hoop or bandage the material.

Specific example

In making Process "American" cheese from whole milk produced in early June around Stockton, Illinois, the following procedure has been successfully employed:

About 10,000 pounds of the ordinary run-of-the-dairy whole milk containing 3.5% of butter fat is placed in a vat, the temperature of the milk at that time being about 70° F.

After the vat has been filled, the usual amount of the usual lactic starter is introduced into the vat, and the milk therein is stirred vigorously. After the starter has been added and stirring commenced, the temperature of the milk in the vat is raised to about 86° F. which requires about fifteen or twenty minutes. At that point, it is advantageous to test the milk for acidity. 19.5 pts. or 0.195% of lactic acid at that stage is normal for the conditions stated.

At or before the conclusion of the period required for heating, the usual amount of rennet is added to the vat. About 3 ounces of rennet per thousand pounds of milk is ordinarily sufficient. After the addition of the rennet, the contents of the vat are stirred vigorously for from 3 to 5 minutes at the conclusion of which period the stirring is discontinued and the curd is allowed to form. The curd is usually fully formed in from 15 to 30 minutes. The curd is then cut and stirring of the vat contents is carried on for about 10 or 15 minutes. At that point it is again advantageous to measure the acidity of the whey, which is found to be between 0.13% and 0.14%. If the procedure is being carried on satisfactorily, after which heat is again applied and the temperature of the vat contents is raised to about 107° F. (105° to 109° F.). This temperature is attained by heating for a period of about 45 minutes.

It is found that by this time the acidity should have been raised to about 0.155%, at which time about ⅔ of the whey may be drawn off from the vat. The temperature of the vat contents is maintained at 107° F. until the curd has properly firmed and its acidity has risen to about 5.8 pH to 6.0 pH, whereupon the remainder of the whey is drawn off from the curd in the usual manner. It may be noted here that when the curd acidity has arrived at the required pH value, the whey acidity under the conditions stated has risen to about 0.195%. However, the whey acidity is more or less incidental and cannot necessarily be relied upon as a proper indication of the curd acidity.

To the drained curd in the vat, there is then added an aqueous solution of edible lactic acid, which preferably, for the amount of milk and under the conditions stated, consists of about 720 pounds of water in which is dissolved 27 pounds of edible lactic acid of 50% strength or its equivalent. The acidity of this solution is much higher than that of normal whey or curd. The water in which the lactic acid is dissolved is cold (about 55° F.), so that the temperature of the contents of the vat is reduced considerably by the addition of the aqueous lactic acid solution. Thereafter, there is no further heating of the vat contents.

The quantity of solution is found to be just about enough to cover the curd when the latter is uniformly distributed throughout the vat.

After the aqueous lactic acid solution has been added, the contents of the vat are stirred quite actively and continuously for about 15 minutes, at the end of which time it will be found advantageous to test the acidity of the material.

The pH should be between 4.8 pH and 5.2 pH. If the pH is too high, more time should be allowed or, if required, more acid should be added. Under normal conditions, when the proper amount of acid has been used, the conclusion of this step of the procedure sees the acid content of the solution reduced to about ⅔ of its original strength, indicating that approximately ⅓ of the lactic acid content of the solution has been absorbed by the material.

Agitation is then discontinued, and the lactic acid solution is drawn off from the vat. This solution may be saved and re-used after fortification with additional acid. The material is then forked to the sides of the vat so as to permit further draining.

In order to obtain the best results in the subsequent "processing" operation, I find it advantageous to remove as much as possible of the solution adhering to the particles of material. This may be effected in any convenient manner. For example, it may be pressed for a few hours, or over night, if convenient.

After the material has been dried to the extent found practicable, it can be processed on the spot. However, I find it advantageous to ship the material to a central processing point where large quantities of material can be collected for blending purposes. Except for long hauls, it is not necessary to ship the material under refrigeration; it is simply put into suitable sanitary containers and shipped by ordinary truck to the processing factory. However, it is advisable to process the material within twenty-four hours after it leaves the vat.

In processing, a batch may consist of normally 100% of my improved material, or 10%, 25%, 50% or more of other cheese may be included in the batch. In processing, a method and an apparatus such as are disclosed in the Norman Kraft Patent No. 2,005,996, June 25, 1935, may be employed, and the usual amount of emulsifying salt, if required, is mixed in with the batch.

If a blend is desired, in order to conform to existing standards as to taste, texture, etc., I use 60% of my improved material, 15 to 20% of young cheese, i. e. cheese about one month old, and 15 to 20% of aged cheese, i. e. cheese about one year old.

If a colored process cheese is desired, coloring matter, for example annatto, may be introduced into the vat or preferably during the cooking stage.

I have discovered the rather surprising fact that in processing a batch containing a relatively large percentage of my improved material, the processing temperature and, to some extent, the period of heating, may be materially increased over that usually employed, without effecting any breaking down or other injury to the finished material. The processing temperature, for example, may be higher than 160° F., whereas the ordinary cheese processing is carried on at a temperature of about 150° F.

An examination of five-pound loaves made according to my procedure indicates that an improvement in the flavor and other characteristics of the packaged cheese occurs during storage after processing, whereas no such improvement is regularly observed in connection with ordinary processed "American" cheese. However, such improvement in flavor or mellowing of the packaged process cheese made by my procedure is not capable of scientific measurement. Nor am I able to offer any reasonably plausible scientific theory in explanation of such improvement.

By the same token, in view of the exceedingly complex chemical processes which take place in any cheese-making method, I am unable to set forth any plausible scientific theory as to the changes resulting from or incidental to the absorption of lactic acid by the curd while the latter is soaking in the lactic acid solution, or why the absorption of lactic acid by the curd effects the results herein set forth. However, proof of the fact that the material resulting from following the procedure above outlined is different from that which is produced at any stage of the ordinary prior cheese-making procedure is furnished by a comparison of the physical characteristics of the material, apart from any chemical analysis of the same. For example, my improved material, on removal from the vat, is found to be granular or non-matting in character, so that it cannot be formed into ordinary merchantable cheese by the usual procedure which would ordinarily be practiced in the case of milled curd resulting from the process. On the other hand, the material as above described can be directly "processed" by heat, with or without other cheese, to form satisfactory "process" cheese. Whether it may be successfully used for other purposes, I am not now advised.

The scope of the invention should be determined by reference to the appended claims.

I claim:

1. The improved step in the art of cheese making, which consists in soaking the usual drained curd in a solution of an edible acid of sufficient strength so as to thereby raise the acidity of the curd rapidly to approximately between 4.8 pH and 5.2 pH.

2. The improvement in the art of making process cheese from material produced by the usual cheese-making procedure, which consists in soaking the usual drained curd in a solution of lactic acid of sufficient strength so as to thereby cause the acidity of said curd to rise rapidly by acid absorption from a point represented by about 5.8 to 6.0 pH to a point represented by a pH of approximately between 4.8 and 5.2 pH, then draining the curd, and then directly processing the material.

3. The improvement in the art of making process cheese, which consists in forming a curd from milk, cutting and firming the curd, draining off the whey, soaking the curd in an aqueous solution of lactic acid of considerably greater acidity than that of the usual drained curd so as to raise the acidity of the curd rapidly, removing the adherent solution, and then processing the material to form molded cheese units.

4. The improved step in the manufacture of process cheese, which comprises soaking the usual drained curd in an aqueous solution of edible acid of considerably greater acidity than that of the usual drained curd, to rapidly develop a high acidity in the curd.

WILLIAM O. BEERS.